United States Patent [19]
Parker et al.

[11] 3,950,568
[45] Apr. 13, 1976

[54] CHUNK STYLE PEANUT BUTTER

[75] Inventors: Wilbur A. Parker, Somerville;
Daniel Melnick, West Englewood, both of N.J.

[73] Assignee: CPC International Inc., Englewood Cliffs, N.J.

[22] Filed: July 18, 1974

[21] Appl. No.: 489,635

Related U.S. Application Data

[63] Continuation of Ser. No. 308,906, Nov. 22, 1972, abandoned.

[52] U.S. Cl. ............................ 426/633; 426/321
[51] Int. Cl.² ........................................ A23L 1/38
[58] Field of Search ................ 426/93, 633, 321

[56] References Cited
UNITED STATES PATENTS

| | | | |
|---|---|---|---|
| 1,395,934 | 11/1921 | Stockton | 426/633 |
| 2,217,701 | 10/1940 | Musher | 426/633 |
| 3,044,883 | 7/1962 | Ferguson, Jr. | 426/633 |
| 3,246,991 | 4/1966 | Avera | 426/633 |
| 3,552,980 | 1/1971 | Cooper et al. | 426/633 |
| 3,615,590 | 10/1971 | Avera et al. | 426/633 |
| 3,619,207 | 11/1971 | Dzurik et al. | 426/633 |
| 3,671,267 | 6/1972 | Gooding et al. | 426/633 |
| 3,749,587 | 7/1973 | Billerbeck et al. | 426/633 |

*Primary Examiner*—Steven L. Weinstein
*Attorney, Agent, or Firm*—Salvatore C. Mitri

[57] ABSTRACT

A chunk style peanut butter containing from about 15 to 25%, by weight, granulated roast peanuts exhibiting good spreadability, resistance to oil separation and desired flavor characteristics.

3 Claims, No Drawings

CHUNK STYLE PEANUT BUTTER

This application is a continuation application of U.S. application Ser. No. 308,906, filed Nov. 22, 1972, now abandoned.

BACKGROUND OF THE INVENTION

1. Field of the Invention

This invention relates to novel chunk style peanut butters and processes for obtaining such peanut butters.

2. The Prior Art

Peanut butter is normally available in two forms, a creamy style and a creamy base with pieces of chunk nuts (peanut granules) mixed therethrough; this latter product is commonly referred to as chunk style or crunchy type peanut butter.

While the creamy type is the more popular of the two types, the chunk style also enjoys a high degree of acceptance as evidenced by the fact that the chunk type peanut butter constitutes about 30% of the total U.S. peanut butter market.

Heretofore, the known chunk style peanut butters have presented certain problems and limitations, the most notable being the limited amount of chunk particles or granules that may be present in the total product. In addition, these products have a tendency to be less spreadable than the creamy style, and yet are more likely to show objectionable oiling off, free oil droplets in areas in juxtaposition to the peanut granules. Furthermore the flavor profiles of the chunk style products differ from the seasoned creamy style peanut butters employed as the major ingredient in their manufacture. The result is that the particular flavor profile which manufactures strive to consistently maintain in a given brand of creamy style peanut butter is not maintained in a chunk style product of the same brand.

The conventional process for making peanut butter comprises the steps of roasting shelled peanuts, cooling and blanching the roast peanuts, removing the germs, sorting to remove the objectionable peanuts for discard, finely grinding the roast peanuts that passed inspection, mixing in optional, but preferred, sugar and salt flavorings, and then regrinding. In making the preferred stabilized peanut butters now on the market, a hydrogenated component described below is introduced prior to the last grinding operation. From about 90 to 95% of the product is ground roast peanuts. The protein content of these conventional peanut butters can be from about 26 to 30% and the oil content from about 48 to 52%.

Because finely ground roast peanuts exhibit gravitational instability (oil layer separating on top of the product) it has become regular practice to add a relatively high melting fat component to the hot peanut butter (about 170°F) some time prior to the filling of the product into jars. These high melting fat components have a melting point in excess of 110°F, but less than 160°F, and can be: a partially hydrogenated fat, a completely hydrogenated fat, mono-(and di) glyceride esters of the saturated fatty acids, or mixtures of these firming up agents. These high melting fat components, sometimes called hard fats, when added in small amounts (viz. 1–5% of the peanut butter), may be introduced as a supplement to the ground roast peanuts or when added in larger amounts (viz. 5–10% of the peanut butter) may be introduced after an equivalent amount of the liquid peanut oil in the ground roast peanuts has been removed. The added hard fat sets up as continuous or semi-continuous stearine structure within the final peanut butter during the cooling of the product and in so doing prevents oil from separating from the peanut butter.

In the preparation of conventional chunk style peanut butter, it is regular practice to superimpose sliced or granulated chunk nuts onto the regular creamy peanut butter prior to the packaging process. In order to incorporate the solid chunk nuts into the creamy peanut butter phase, the two phases, i.e., creamy and chunk, must be mixed or agitated in order to properly distribute the chunk nuts throughout the total mass. The agitation or mixing which is necessary to obtain an even distribution of chunk nuts in the creamy phase can produce an end-product which has a tendency to exhibit oil separation because of marked disruption of the continuous stearine structures. Higher levels of chunk nuts accentuate the problem. If not mixed adequately, the end-product is non-uniform with regard to distribution of the chunk nuts and variable in spreadability.

In conventional chunk style peanut butters, which are available in the U.S. market, there are on the average about 10% chunk nuts, by weight, in the total product. The following Table I summarizes an analyses of commercially available chunk style peanut butter products purchased in retail supermarkets during 1972:

TABLE I

| COMMERCIAL PRODUCT | NUMBER OF SAMPLES TESTED | AVERAGE CHUNK CONTENT (% BY WEIGHT) | RANGE OF CHUNK NUTS (%) |
|---|---|---|---|
| TA | 1 | 3.4 | — |
| S-C | 1 | 3.5 | — |
| T-T | 1 | 5.9 | — |
| KR | 1 | 6.1 | — |
| R-V | 1 | 6.8 | — |
| S-V | 1 | 7.6 | — |
| NU | 3 | 7.7 | 5.9 – 9.2 |
| L-L | 5 | 7.9 | 3.0 – 10.7 |
| ST | 1 | 8.7 | — |
| A-P | 3 | 8.7 | 5.1 – 11.9 |
| R-G | 1 | 8.9 | — |
| JI | 26 | 9.1 | 6.5 – 12.2 |
| F-C | 1 | 10.6 | — |
| SK | 25 | 12.1 | 10.1 – 13.5 |
| H-T | 1 | 12.2 | — |
| SU | 1 | 13.6 | — |
| PL | 1 | 13.9 | — |
| BA | 1 | 14.0 | — |

ANALYSES OF CHUNK STYLE PEANUT BUTTER FOR PERCENT OF CHUNK NUTS

TABLE I-continued

ANALYSES OF CHUNK STYLE PEANUT BUTTER FOR PERCENT OF CHUNK NUTS

| COMMERCIAL PRODUCT | NUMBER OF SAMPLES TESTED | AVERAGE CHUNK CONTENT (% BY WEIGHT) | RANGE OF CHUNK NUTS (%) |
| --- | --- | --- | --- |
| P-P | 20 | 14.2 | 12.7 – 14.6 |

Many consumers who enjoy chunk style peanut butters would enjoy a product with significantly more chunk nuts than previously manfactured if the qualities associated with the peanut butter products now being manufactured could be maintained or improved upon.

More particularly, a desirable chunk style peanut butter would be one or more of the following:
1. A chunk style peanut butter containing a higher level of chunk nuts than is now available;
2. A chunk style peanut butter with good organoleptic properties;
3. A novel chunk style peanut butter with good spreadability;
4. A chunk style peanut butter with good resistance to oil separation at elevated temperatures;
5. A chunk style peanut butter which can substantially match the flavor profile of a creamy style peanut butter containing seasonings, for example, salt and sugars.

SUMMARY OF THE INVENTION

It has now been discovered how to provide novel chunk style peanut butters which contain significantly more peanut chunks than is customarily found in the conventional chunk peanut butters, and at the same time provide a product exhibiting good mouthing quality, good spreadability and superior resistance to oil separation, particularly at elevated room temperatures.

In another aspect of this invention, these novel chunk style peanut butters are seasoned in a particular manner with salt and sugars to a desirable flavor.

More particularly, this invention provides in its broad aspect a chunk style peanut butter exhibiting good spreadability and resistance to oil separation comprising a mixture of
1. from about 15 to 25%, by weight, roast peanut granules
2. from about 75 to 85%, by weight, of a creamy phase, said creamy phase comprising
    a. finely ground roast peanut paste, said paste having a total oil content of from 52 to 56%, by weight, of the creamy phase
    b. an amount hard fat, the amount of hard fat being such that the oil has a Solids Content Index of
       3.0 to 5.5 at 50°F
       1.5 to 3.0 at 80°F
       0.5 to 1.5 at 102°F
    c. from 0 to 1.7%, by weight, of the creamy phase, salt, and
    d. from 0 to 4%, by weight, of the creamy phase, added sugar.

DETAILED DISCUSSION OF THE INVENTION AND ITS PREFERRED EMBODIMENTS

In the earlier attempts to produce a chunk style peanut butter with up to 20% chunk nuts, by weight of the total product, it was found by our expert peanut butter evaluation panel that an unacceptable product resulted if the chunk nuts were simply admixed with a conventional stabilized creamy style peanut butter. The product exhibited objectionable oil separation on standing even at room temperature, presented an undesirable mouthing quality and was poorly spreadable on bread (tore the latter). In addition, the product which was prepared by mixing chunk nuts with a creamy peanut butter desirably seasoned was objectionable in that it did not present the flavor profile of the desirable creamy peanut butter.

It was found that when the total solids in the form of added extra chunk nuts and preferred dry flavoring ingredients were increased, spreadability of the end product was objectionably firmer. Despite the fact that there is a sensitivity to adding more liquid vegetable oil to chunk style peanut butter because of the propensity of the latter to oil off, the products of the present invention have now more oil added to them to eliminate the spreadability problem. However, it is essential that the increased oil content be supplemented with more of the hard fat component in order to maintain protection against oil separation at elevated room temperatures, viz., 90°–100°F. In other words, we have now found it possible to attain greater spreadability without fear of oiling off in a chunk style peanut butter containing more peanut chunks than conventional chunk style peanut butter, a product which is known to be far more susceptible to oiling off than its creamy style counterpart.

When adjusting the liquid oil content in the creamy peanut butter phase for use in the present invention with a liquid vegetable oil, such as for example refined deodorized peanut oil, the liquid oil in the creamy phase is adjusted to from 52 to 56%, preferably 53 to 56%, by weight of the creamy phase. We strive to maintain consistently a single most preferred creamy peanut butter phase in our novel product, namely, a creamy phase having an oil content of 53%. (The Standard of Identify for Peanut Butter, promulgated by the U.S. Food and Drug Administration, specifies a maximum of 55% total oil content. The oil content of the creamy phase of the products of the present invention can approach or even exceed this 55% maximum. However, the oil content of the completed novel chunk-style peanut butters of this invention all contain 55% or less total oil content). Because the oil content of peanuts is subject to natural variations, liquid vegetable oil, for example peanut oil, additions of varying amounts can be required to obtain a creamy phase with the required liquid oil content. This is illustrated by the data in the following Table II.

In order to obtain good stability against oil separation, an amount of hard fat must be added to the creamy phase such that the total oil (liquid oil and hard stock) in the creamy phase will present a Solids Content Index of
3.0 to 5.5 at 50°F
1.5 to 3.0 at 80°F
0.5 to 1.5 at 102°F.

A variety of hard fats can be employed in the practice of this invention. Preferred hard fats for use in this invention are disclosed in U.S. Pat. No. 3,671,267 to Gooding, Parker and Melnick, incorporated herein by reference.

By way of example a creamy peanut butter phase suitable for use herein can be the peanut butter disclosed in U.S. Pat. No. 3,671,267, Example 1, which is disclosed to contain 51.5 liquid oil and 2.5% hard fat stabilizer, if the peanut butter is modified by adding liquid peanut oil to adjust the oil content as required in this invention, and adding 0.15% of the hard fat stabilizer for each 1% addition of peanut oil; the percentages referring to percent by weight of the creamy phase.

Chunk nuts suitable for use herein have a particulate size of from 0.15 cm. to 1.00 cm. in largest cross section. Processes for obtaining such chunk nuts are known.

Most conventional peanut butters contain added seasonings such as salt and sugar. The salt generally employed is sodium chloride. Examples of suitable sugars include sucrose, dextrose, levulose and molasses.

In another aspect of this invention, it has been discovered that when a chunk style product is formed from a desirable seasoned creamy peanut butter, a more desirable chunk style product can be obtained when the seasoned creamy phase of a chunk style peanut butter contains added extra seasoning components, (e.g., dextrose, salt and sugar), the extra components being about in proportion to the chunk nuts as though these had been included finely ground in the creamy phase. In other words, the percent of seasoning ingredients by weight of chunk style peanut butter, in a chunk style peanut butter should be about the same as the percent of seasoning ingredients, by weight of creamy style peanut butter, in a desirable creamy style peanut butter. For example, in the case of an end product comprising a desirable seasoned peanut butter which included 20% roast peanut chunks, this means adding 25% more of the salt and sugar seasoning to modify the 80% creamy phase peanut butter component. It has been surprisingly found that chunk style peanut butter prepared in this manner substantially matches the flavor profile of the seasoned creamy peanut butter not containing the added extra seasonings.

More specifically, there is presented a process for forming a seasoned chunk style peanut butter substantially matching the flavor profile of a selected creamy peanut butter containing seasoning ingredients comprising mixing up to about 25%, by weight, roast peanut granules, with a creamy peanut butter phase containing an amount of seasoning ingredients, said amount of seasoning ingredients in the creamy phase being an amount to provide a percentage of seasoning ingredients, by weight of the chunk style peanut butter, substantially the same as the percentage of the seasoning ingredients in the selected creamy peanut butter. In a preferred aspect of this process, the chunk style peanut butter is the novel chunk style peanut butter disclosed herein. In the preferred process, chunk style peanut butters can be formed which present substantially all of the organoleptic qualities of conventional seasoned stabilized creamy style peanut butters. This preferred process is especially significant wherein the selected seasoned stabilized creamy style peanut butter is especially desirable and acceptable, as shown for example, by its commercial success.

Thus, a preferred chunk style peanut butter of the present invention consists of (a) a creamy phase of finely ground roast peanuts plus vegetable oil, seasonings and hard fat stabilizers and (b) granulated roast peanuts of average particulate size of from 0.15 cm. to 1.00 cm. in largest cross section, said creamy base having a total oil phase of 52 to 56%, by weight, added extra seasonings, for example, salt and sugars to balance off the chunks nuts as though these had been included finely ground in the creamy phase, added hard fat stabilizer to balance off the extra oil incorporated in the creamy base, and said chunk style peanut butter containing from 15 to 25% by weight of the granulated roast peanuts.

Particularly preferred chunk style peanut butters of the present invention consist of granulated roast peanuts of above said average particulate size dispersed in a creamy peanut butter phase having by weight of total oil phase of 53 to 56%, 1.1 to 1.7% salt, 2 to 4% are added sugars (i.e., not present in the peanuts) and hard fat stabilizer to produce in the total oil phase a Solids Content Index of 3.0 to 5.5 at 50°F, 1.5 to 3.0 at 80°F, and 0.5 to 1.5 at 102°F, and said chunk style peanut butter containing from 15 to 25% by weight of the granulated roast peanuts. The seasonings employed in these preferred chunk style peanut butters provide especially delectable chunk style peanut butters.

More desirably the novel chunk style peanut butter of this invention consist of the above mentioned creamy phase comprising finely ground roast peanuts, peanut oil, flavorings and hard fat stabilizer wherein the granulated roast peanuts have a particulate size of from 0.15 cm. to 1.00 cm., and preferably from 0.40 cm. to 0.80 cm., in largest cross section, and the said creamy phase having added vegetable oil, preferably peanut oil, to provide a total oil content of 53 to 54% by weight in the said creamy phase. Here also the granulated roasted peanuts can desirably comprise 15 to 25% by weight of the total product.

In the creamy phase formulations shown in the following Table II, there is present 2.7% stabilizer for those blends having an oil content of 53.0 and 2.85% of stabilizer in the case of the creamy base with an oil content of 53.8%. The data shown in Table II are illustrations of the practice followed in the present invention in preparing a suitable creamy phase from peanuts with varying oil contents leading in this case to a preferred chunk style peanut butter product of this invention when mixed with peanut chunks to provide a chunk style peanut butter containing 18% chunk nuts. With this teaching, those skilled in the art can provide comparable guidelines when using different hard fat stabilizers in different ranges in their creamy peanut butter phases.

TABLE II

CREAMY BASE FORMULATIONS FOR NOVEL CHUNK STYLE PEANUT BUTTER*

Adjustments for maintaining, as close as possible, the desired 53% oil content in the creamy phase of the new chunk style peanut butter.

| Oil in Ground Roasted Peanuts (Percent by weight) | Ground Roast Peanuts (Percent by weight of creamy phase) | Peanut Oil Addition (Percent by weight of creamy phase) | Additives ≠ (Percent by weight of creamy phase) | Creamy Phase Oil Content (Percent by weight of creamy phase) |
|---|---|---|---|---|
| 49.0 | 83.80 | 9.20 | 7.00 | 53.0 |
| 50.0 | 85.50 | 7.50 | 7.00 | 53.0 |
| 50.5 | 86.00 | 7.00 | 7.00 | 53.0 |
| 50.7 | 86.50 | 6.50 | 7.00 | 53.0 |
| 51.0 | 87.00 | 6.00 | 7.00 | 53.0 |
| 51.5 | 88.00 | 5.00 | 7.00 | 53.0 |
| 51.8 | 88.50 | 4.50 | 7.00 | 53.0 |
| 52.1 | 89.00 | 4.00 | 7.00 | 53.0 |
| 52.3 | 89.50 | 3.50 | 7.00 | 53.0 |
| 52.6 | 90.00 | 3.00 | 7.00 | 53.0 |
| 52.9 | 90.50 | 2.50 | 7.00 | 53.0 |
| 53.1 | 91.00 | 2.00 | 7.00 | 53.0 |
| 53.4 | 91.50 | 1.50 | 7.00 | 53.0 |
| 53.6 | 92.00 | 1.00 | 7.00 | 53.0 |
| 53.9 | 92.50 | 0.50 | 7.00 | 53.0 |
| 54.1 | 93.00 | 0.00 | 7.00 | 53.0 |

*Chunk style peanut butter providing in this case 18% by weight of peanut chunks.

≠ Sugars (dextrose and sucrose) = 3.0%; salt = 1.30%; hard fat stabilizer = 2.7% by weight of the completed creamy phase. The sugar-salt seasonings are about 22% greater than the concentration found in a desirable conventional creamy style peanut butter. The extra seasonings are provided to balance off 18% chunk peanuts to provide a chunk style peanut butter product presenting a flavor substantially the same as the desirable creamy style peanut butter. The hard fat stabilizer employed is the hard fat stabilizer disclosed in Example I of U.S. Pat. No. 3,671,267.

The preferred chunk style peanut butters are formed by mixing 18 parts roast peanut granules with 82 parts of creamy phase disclosed in Table II to uniformly distribute the roast peanut granules through the creamy phase.

A number of criticisms might be raised by those skilled in the art in evaluating the merits of the present development. However, these criticisms highlight the surprising results obtained. In the first place, the creamy peanut butter customarily used in the past in making the new chunk style peanut butters may not now be employed. Two formulations for creamy type peanut butters will be required within a given plant; a creamy type packed out as a desirable creamy style peanut butter, and another type prepared especially to receive the granulated peanuts for the new chunk style peanut butters of this invention. Secondly, the flavor balance of the creamy type prepared especially for the novel chunk style peanut butter products is poorer than that of the desirable regular creamy style product, when evaluated strictly as a cream style product. Those skilled in the art would object with reason to creamy type products prepared especially as a creamy phase for the novel chunk style product had it alone been packed out as creamy style peanut butter. Obviously the coarsely granulated peanuts, the chunks themselves, cannot be characterized as peanut butter. However, putting the two components together — the required creamy phase, unacceptable as a desirable peanut butter, and the peanut chunks also unacceptable per se as peanut butter — constitute a synergistic combination to produce a product which is surprisingly superior in all organoleptic properties to conventional chunk style peanut butter. The new products of our invention are now superior in spreadability, resistance to oil separation, flavor balance, and mouthing quality to the prior art products. For the first time there can be obtained substantial organoleptic duplication between chunk and creamy style peanut butter within a given brand, i.e., with the exception of the texture difference due to the chunk nuts present. All this is attained by combining two components, each of which are rejectable as acceptable peanut butters per se.

In preparing the novel chunk style peanut butters of this invention, the peanut granules may be obtained by any of the conventional methods such as chopping, slicing, or granulating. The creamy phase can be prepared according to conventional practice as described earlier in this specification. In adding the chunk nuts to the required creamy phase, the granules should be fed on a continuous basis into the creamy base, the volume of which at the time of admixture is small as possible. Preferred processing methods involved protecting the products from oxidative degradation from the time of roasting through packaging.

More specifically the process of making preferred chunk style peanut butters containing 15 to 25% roast granulated peanuts involves forming a creamy phase comprising roasting peanuts, cooling and blanching same, removing the defective nuts, reducing in size the blanched and sorted nuts to form a finely ground smooth peanut paste, adding salt and sugars to bring their respective increments to 1.1 to 1.7% and to 2 to 4% by weight of the creamy phase, adding liquid vegetable oil to bring the total oil content of the creamy base to 52 to 56% by weight, and adding hard fat stabilizer such that the oil in the creamy phase has a Solids Content Index of 3.0 to 5.5 and 50°F, 1.5 to 3.0 at 80°F and 0.5 to 1.5 at 102°F; adding and uniformly dispersing roast granulated peanuts having average particulate size of from 0.15 cm. to 1.00 cm. in largest cross section into the creamy phase, and then packaging the chunk style peanut butter into hermetically sealed containers.

More desirably, the process of making our new chunk style peanut butter containing 15 to 25% roasted granulated peanuts, comprises roasting peanuts, cooling and blanching same, removing the defective nuts, reducing in size the blanched and sorted nuts to form a smooth paste, adding salt and sugars to bring their respective increments to 1.1 to 1.7% and to 2 to 4% by weight of the creamy phase, adding liquid peanut oil to bring the total oil content of the creamy phase to 53 to 54% by weight, and adding hard fat stabilizer to give the oil in the creamy phase a Solids Content Index of 3.0 to 5.5 at 50°F, 1.5 to 3.0 at 80°F, and 0.5 to 1.5 at 102°F, degassing the creamy phase to remove entrained and occluded air, chilling said base to 70°F, preferably to 75°–85°F, adding and uniformly dispersing the roasted granulated peanuts having a particulate size of from 0.15 cm. to 1.00 cm., preferably 0.40 cm., in largest cross section, into the creamy phase, and finally packaging the chunk style peanut butter under inert gas, preferably nitrogen, in hermetically sealed containers with the oxygen content in the headspace less than 2% following packaging in said container.

EXAMPLES

Chunk style peanut butter products were made in accordance with the above teachings wherein variations were made in the oil content and seasoning ingredients of the creamy phase. Control and unacceptable products were included for illustrative purposes; Table III, which follows, reports the rating of the products.

were rated acceptable and superior to the Control product. However, when Products 5 and 6 were compared with products 7 and 8, preferred examples of the invention, the latter products were preferred because of the higher levels of chunk nuts present. Product 7 was tested versus the Control product with consumers in an in-home use evaluation and Product 7 was preferred 2:1 by those who normally use the chunk style product in preference to the creamy style peanut butter and by those who like and buy both styles.

The Solids Content Index of the liquid oil present in Products 5–8 are as required in this invention.

The procedures employed in determining the Solids Content Index of the total oil (liquid oil and hard fat) of the creamy phase or the chunk style peanut butters of this invention are as follows:

a. The product is brought to a temperature of about 120°F and then run through a sieve, viz. 30 mesh, to remove the gross peanut granules.
b. The creamy base is then heated to 160°F held at that temperature for about 30 minutes, and then filtered at 160°F.
c. The separated oil phase is then analyzed by the dilatometric method described by Fulton et al

TABLE III

ACCEPTABILITY RATINGS OF CHUNK STYLE PEANUT BUTTER

| CHUNK STYLE PRODUCT | CHUNK NUTS (PERCENT BY WEIGHT OF TOTAL PRODUCT) | PERCENT PEANUT OIL IN CREAMY PHASE (PERCENT BY WEIGHT OF CREAMY PHASE) φ | SEASONING INGREDIENTS INCLUDED IN CREAMY PHASE (PERCENT BY WEIGHT OF CREAMY PHASE) | | | RATINGS* |
|---|---|---|---|---|---|---|
| | | | DEXTROSE | SALT | SUCROSE | |
| CONTROL | 12 | 51.5 | 2.25 | 1.21 | 0.25 | NA |
| 1 | 15 | 51.5 | 2.25 | 1.21 | 0.25 | NA |
| 2 | 18 | 51.5 | 2.25 | 1.21 | 0.25 | NA |
| 3 | 18 | 51.5 | 2.75 | 1.48 | 0.25 | NA |
| 4 | 21 | 54.0 (No extra added hard fat | 2.85 | 1.53 | 0.32 | NA |
| 5 | 15 | 54.0 (With extra added hard fat) | 2.25 | 1.42 | 0.60 | A |
| 6 | 15 | 54.0 (With extra added hard fat) | 2.65 | 1.42 | 0.25 | A |
| 7 | 18 | 53.0 (With extra added hard fat) | 2.75 | 1.48 | 0.31 | P |
| 8 | 21 | 54.0 (With extra added hard fat) | 2.85 | 1.53 | 0.25 | P |

*NA = Not Acceptable as products of this invention.
A = Acceptable as products of this invention.
P = Preferred products of this invention.
φ Each of the creamy phases included an amount of the hard fat stabilizer disclosed in Example I, U.S. Patent 3,671,267. Products 1–4 contain 2.5% by weight, of the creamy phase, of the stabilizer. In products 5–8, the amount of stabilizer was 2.5%, by weight of the creamy phase, plus an extra added portion to increase the amount of the stabilizer 0.15% for every 1% increase in oil above 51.5% in the creamy phase.

The Control product is a typical prior art chunk style peanut butter. This product was rated unacceptable on the basis that the product contained a low level of chunk nuts, exhibited poor spreadability and presented a poor flavor profile since no additional seasonings were added to compensate for the granulated chunk nuts. Products 1 and 2 were rated unacceptable on the basis that spreadability of the products was poor; and the flavor profile was poor since no flavoring ingredients were added to compensate for the granulated chunk nuts. To improve spreadability with more working of the products, resulted in oil separation even at room temperature.

Products 3 and 4 were also rejected as unacceptable. Product 3 exhibits poor spreadability and Product 4 exhibits poor stability against oil separation.

Products 5 and 6 which are examples of the invention containing by weight 15% chunk nuts and added oil with stabilizer and added extra seasoning ingredients (Journal American Oil Chemists Society, Vol. 31, page 98, 1954).

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A chunk style peanut butter exhibiting good spreadability and resistance to oil separation, said chunk style peanut butter being obtained by a. providing a creamy phase consisting of peanut butter in an amount of about 75 to 82% by weight of said chunk style peanut butter;
b. adding liquid vegetable oil to said creamy phase in an amount to bring the oil content of the creamy phase to no less than 53% to about 56% by weight oil based upon the weight of said creamy phase;
c. further adding an amount of hard fat to said creamy phase such that the total oil content comprising said liquid oil and said hard fat in said creamy phase has a Solids Content Index of 3.0 to 5.5 at 50°F., 1.5 to 3.0 at 80°F., and 0.5 to 1.5 at 102°F.;
d. next, adding to said creamy phase seasonings comprising salt and sugars in an amount of at least 4.2 to about 7.0% by weight based upon the weight of said creamy phase;
e. admixing into said creamy phase roasted peanut granules in an amount of no less than 18% to about 25% by weight of said chunk style peanut butter, the largest particle cross-section of said granules being about 0.15 cm. to 1.0 cm. and,
f. continuing the admixing of said granules into said creamy phase until a homogeneous mixture thereof is obtained, said homogeneous mixture having a total oil content comprising said liquid oil and said hard fat in an amount of no more than 55% by weight of said chunk style peanut butter and wherein said seasonings are present in an amount of at least 3.1 to about 5.7% by weight of said chunk style peanut butter.

2. The chunk style peanut butter of claim 1 wherein the salt is present in an amount of at least 1.1% to about 1.7% by weight and the sugars are present in an amount of at least 2% to about 4% by weight.

3. The chunk style peanut butter of claim 1 wherein said cross section is about 0.4 cm. to 0.8 cm.

* * * * *